United States Patent Office 3,179,509
Patented Apr. 20, 1965

3,179,509
METHOD OF PREPARING LIQUID FERTILIZER
Edwin Kaine Schuman, 1106 Pine St., Rolla, Mo.
No Drawing. Filed Apr. 1, 1963, Ser. No. 269,814
7 Claims. (Cl. 71—1)

This invention relates to an improved liquid fertilizer wherein the essential nutrients present therein are instantly available, thus making the product especially useful for seasonal plants of the flower type or vegetable or fruit bearing varieties. The invention further relates to a novel method of formulating a liquid fertilizer which embodies constituents most needed by the plants in readily available form for most efficient supply of nutrients to the roots of the plants as required. In particular, the present invention relates to a liquid fertilizer so formulated that chemical reactions produce a buffered, saturated solution containing a suspension and capable of evolving anhydrous ammonia at normal ambient temperature, and in proper amounts for uptake by the plants.

Many different types of fertilizers are presently available on the market for different uses, but for the most part, are made up of compounds capable of furnishing only nitrogen, phosphorus and potash. Most of these fertilizers are applied as a dry mix, and depend on moisture in the soil for dissolution thereof, so that the nutrients are made available for intake by the roots of the plants. The utilization of dry fertilizers simplifies the application procedures required therefor, since the product need only be spread over the ground and rain or irrigation water ultimately effecting dissolution of the product for seepage into the ground around the roots of the growing plants. This application method is entirely satisfactory for field crops and the like where the soil can be tested and built up, but is not entirely successful for seasonal plants bearing blooms, vegetables or fruits, which need and use more plant foods at the time of bloom or bearing fruit or vegetables. Thus, the plant food may be made available too early to the plants and rapidly dissipate in effectiveness, or the plant food may not be dissolved into the ground in time for the major concentration thereof to be available for intake by the plants at the most critical time of their development. The plants suffering from malnutrition may be hurt before the plant food is available in proper form for the roots, or the components of the fertilizer composition may be made available at too high a level during the early growth of the plants and result in damage to the growth or wastage of the fertilizer.

It is well known through biochemical studies and practical experience in agricultural uses, that anhydrous ammonia is a superior fertilizer for the purpose of supplying plant food to growing plants immediately after injection of the ammonia into the ground. In this manner, the yields of the plants can be efficiently increased in a very short interval of time. However, expensive and relatively complex machinery is needed for application of anhydrous ammonia, since the same must be injected into the ground in liquid form. It is manifest that application of liquid ammonia is not practical by those wanting to fertilize their plants in small gardens, house plants or small flower tracts.

However, the conventional fertilizer products referred to above and which are capable of supplying nitrogen, phosphorus and potash to the plants, fail to furnish magnesium, one of the primary plant foods which is especially necessary for the most efficient and rapid growth of plants bearing vegetables or fruits, or that produce blooms. These types of plants are greatly benefited by a fertilizer composition including magnesium, since this element has been found to be the nucleus of the chlorophyll molecule and to act as a carrier of phosphate in the plant. It is closely related to the formation of phospholipids and synthesis of nucleoproteins. It is also known that magnesium is required in carbohydrate production and transportation of constituents throughout the plant. Thus, although magnesium is now recognized as a primary plant food, it is difficult to make the compound available to the roots of the plant because when magnesium ions are present in conjunction with phosphate radicals, the resulting magnesium phosphate formed therefrom is relatively water insoluble.

It is therefore the primary object of the present invention to provide a fertilizer in liquid form which can be easily applied to the ground surrounding the roots of the plants to be fed, and which contains constituents capable of liberating free ammonia in proper amount for intake by the plants and vegetation.

Another important object of the present invention is to provide a fertilizer so formulated that chemical reactions produce a buffered, saturated solution and suspension which evolve anhydrous ammonia at ordinary temperatures, and in proper amount for uptake by the plants. In this connection the suspension acts as a reserve to continue and prolong the evolution of ammonia.

It is a further important object of the invention to provide a liquid fertilizer composition adapted to supply all of the primary plant foods most needed by the plants and including nitrogen, phosphate and potassium along with magnesium, sodium, sulfur and boron, without endangering the plants because of excessive quantities of the fertilizer components being present, and assuring supply of the nutrients to the plants at a relatively constant rate over an extended period of time.

Another significant object of the invention is to provide an improved method of preparing a liquid fertilizer composition as described above wherein epsomite, sodium dibasic phosphate and ammonium nitrate are introduced into water in successive order, to produce a final composition capable of supplying the most needed nutrients to the plants, and including magnesium ammonium phosphate, sodium ammonium hydrogen phosphate, and ammonium sulfate. A still further important object in this respect is to provide a method of preparing a liquid fertilizer as described wherein the amount of sodium dibasic phosphate added to the magnesium sulfate is in excess of the stoichiometric quantity reactable with the magnesium compound, while the ammonium nitrate is also present in excess of the stoichiometric amount reactable with the other components, to produce a fertilizer composition having constituents in excess therein, producing a solution and suspension capable of evolving ammonia over an extended period of time so that release of nitrogen in the ground is at a relatively slow rate but sufficient to supply all needed ammonia to the roots of the plants regardless of the state of development thereof.

Another important object of the invention is to provide a liquid fertilizer composition of the characteristics set forth above, which is made up of relatively inexpensive constituents, and which may be packaged employing readily available bottling equipment and resulting in the production of a final product that is free of large crystals, safe to handle, presents no transportation problems, and which can be sold through normal commercial outlets.

An important aim of the invention also, is to provide a liquid fertilizer embodying magnesium as a constituent which is present in a form that can be readily taken up by the roots of the plants and which is easily assimilated within the plants for use in photosynthesis.

Also an important aim of the invention is the provision of a liquid fertilizer composition and a method of producing the same, wherein an excess of ammonium nitrate is added to the admixture of magnesium sulfate and sodium dibasic phosphate, to provide a final reaction product wherein free ammonia is in effect stored in the solution and suspension at a low pressure thereby making the product safe and usable at ambient temperature conditions and resulting in slow release of ammonia from the fertilizer when the composition is applied to the ground surrounding the plants.

An important object of the invention is to provide a liquid fertilizer containing magnesium ammonium phosphate, sodium ammonium hydrogen phosphate, ammonium sulfate, and an excess of ammonium nitrate, wherein the constituents are held in solution and suspension in the liquid carrier therefor, by virtue of the fact that the solution is slightly acid, but is characterized by the property of becoming slightly basic when the solution is diluted with water to a usable ratio.

A further important aim of the invention is to provide a liquid fertilizer embodying magnesium ammonium phosphate, sodium ammonium hydrogen phosphate, sodium dihydrogen phosphate, and ammonium sulfate, wherein free ammonia is evolved from the product while in the ground by virtue of the catalyzing effect of the phosphate ions present in the solution which are hydrolyzed by the excess of water present in the soil.

Other important objects of the present invention will become obvious or be explained in greater detail as the following specification progresses.

The liquid fertilizer of the present invention is prepared by reacting and mixing a number of commercially available, inorganic, relatively inexpensive compounds which interact to form a complex system of chemical products and a mixture capable of furnishing all of the major needed constituents for plants that bear blooms, fruit or vegetables, and that may be stored at ambient temperature, applied by simply sprinkling or spraying the same on the ground around the plants to be fed, and which is characterized by the property of evolving ammonia at a slow controlled rate for direct intake by the plants. In accordance with the preferred method of the invention, epsomite is initially added to a predetermined quantity of hot water and the admixture suitably agitated to effect dissolution of the magnesium compound in the water. Next, an amount of anhydrous sodium dibasic phosphate is introduced into the solution and the mixture further agitated to form a smooth pasty substance. A quantity of sodium dibasic phosphate in excess of the stoichiometric amount thereof reactable with the magnesium sulfate, is employed to assure quick and complete precipitation of magnesium hydrogen phosphate in the solution. Technical grade potassium chloride containing a minimum of 62% $K_2O$ is stirred into the chemical compound. Again, addition of the KCl should be effected before substantial cooling of the solution to obtain dissolution of the potassium compund and formation of a homogeneous mixture. Technical grade borax of 99.5–100% purity is then immediately introduced into the liquid admixture with the material being stirred until the borax has completely dissolved. The final step involves addition of fertilizer grade ammonium nitrate containing a minimum of 33.5% nitrogen, to the solution, with continuous agitation of the liquid suspension. An additional amount of water is then added to the solution to bring the same up to a specified volume, but not sufficient to change the pH of the product. The solution can then be bottled immediately in conventional bottling apparatus, or can be introduced into a storage vessel for packaging at a later time.

External heating or refrigeration of the product during successive addition of the ingredients is not required because of the unique thermal balance between the various materials introduced into the composition. The heat loss obtained during dissolution of the ammonium nitrate in the solution is very nearly offset by the exothermic reaction of the ammonia gas dissolving a portion of the excess ammonium nitrate. In this manner, expensive processing equipment is not required and the product can be immediately bottled out of the primary mixing vessel.

A specific example of a preferred formulation embodying the concepts of the present invention, is set forth hereinafter, but it is to be understood that the only major critical feature of the process is the order of mixing of the ingredients, and the different constituents can be varied within operable ranges without departing from the inventive concepts hereof. Thus, the proportions stipulated are representative only and as will be apparent from the process, as long as the major constituents are in excess of the stoichiometric proportions thereof, an operable fertilizer composition will be formed capable of furnishing the most needed nutrients to plants.

For purposes of simplicity, the example hereunder is limited to the production of 16 fl. oz. of liquid fertilizer, but it is to be recognized that any amount of the composition may be prepared with a corresponding increase or decrease of the components in their respective ratios.

8 oz. of water at about 120° F. is added to a vessel having an agitator operably associated therewith. 1.5 oz. av. of epsomite ($MgSO_4.7H_2O$) is immediately introduced into the hot water and the solution stirred until the magnesium sulfate composition is completely dissolved. This normally requires about 1 minute. Next, 3 oz. av. of anhydrous sodium dibasic phosphate ($Na_2HPO_4$, technical grade) is added to the solution before the water is allowed to cool. The solution is stirred until a homogeneous, white, pasty mass is formed which usually is produced in a time of the order of 1 to 2 minutes. The reaction elevates the temperature of the solution. Magnesium hydrogen phosphate is quickly and completely precipitated since the phosphates are in excess. The solution is basic at this point. 1.17 oz. av. of refined potassium chloride (KCl containing a minimum of 62.0% of $K_2O$, technical grade) is next added to the hot solution with uniform agitation thereof for about 1 minute to effect dissolution of the compound. The potassium chloride cools the solution slightly, acts as a dispersing agent and prevents the formation of large lumps or granules of phosphates in the solution, and assures the maintenance of a smooth and finely divided suspension in the liquid. The solution is still basic. Immediately after dissolution of the potassium chloride. 0.17 oz. av. of borax ($Na_2B_4O_7.10H_2O$, 99.5–100% purity, technical grade) is stirred into the solution until dissolved. Agitation normally should be continued for about 1 minute. Finally, 6.45 oz. av. of ammonium nitrate ($NH_4NO_3$, 33.5% N, fertilizer grade), is added and the entire solution is stirred for 1 to 3 minutes or until it is homogeneous in appearance. Additional water may now be added to bring the entire composition up to a volume of 16 fl. oz. and which normally requires about 1 to 2 oz. of water. The product can now be bottled immediately although the reactions have not proceeded far enough for the product to be used. It has been determined that the complete reactions will take place within a time period of about 15 to 20 minutes, and thus by the time the composition has been packaged and sent to distributors, there is no question of the product being in final form for immediate application to the soil surrounding the plants to be fed.

The final product produced in accordance with the procedure above, is an acid, saturated, buffered solution having a finely divided suspension therein. The product is capable of evolving ammonia with the suspension serving as a reserve of ammonia ($NH_3$). Some of the ammonium nitrate goes into solution by virtue of reacting with the magnesium hydrogen phosphate, some goes into solution from reacting with the sodium dibasic phosphate to form sodium ammonium acid phosphate, and some by reacting with liberated sulfate ($SO_4$) ions to form ammonium sulfate. This series and combination of reactions produces a system which liberates ammonia as a gas. The liberated ammonia gas then dissolves the excess of ammonium nitrate. The final product is slightly acid, having a pH of approximately 5.9. A volume of 16 fl. oz. weighs about 22.5 oz. av. and contains approximately 12.29 oz. av. of solids with about 8–10 fl. oz. of water.

The user of the liquid fertilizer composition dilutes the product by employing 1 fl. oz. of the fertilizer for each 1 gal. of water, thus producing a dilution suitable for direct application to the soil surrounding the plants to be fed, and at that point having a pH of approximately 7.4. The fertilizer is applied directly to the soil around the plants with best results being obtained by thorough soaking of the soil with the diluted fertilizer. Application should be repeated every 1 to 2 weeks during the growth season of the plants. For vegetation in the nature of house plants such as African violets or the like, 1 teaspoon of the fertilizer prepared in accordance with the procedure above, should be used for each quart of diluting water. Again, the frequency of application should be of the time period specified.

The chemical explanation of the manner of introducing magnesium into the present fertilizer and the mechanism or chemical reasons why the present fertilizer evolves ammonia gas ($NH_3$) at a more rapid rate than a saturated solution of ammonium nitrate in water is shown in the following equations.

Some of the chemical reactions involved after the mixing of the proper amounts of the ingredients are:

(1) $Na_2^+ HPO_4^{--} + Mg^{++} SO_4^{--}$
$= Mg^{++} HPO_4^{--} + Na_2^+ SO_4^{--}$

Thus, when anhydrous sodium dibasic phosphate is added to the solution of magnesium sulfate which was initially prepared, the products are sodium sulfate (water soluble) and a white insoluble precipitate of $MgHPO_4$ whose solubility is 0.3 gram per 100 cc. of cold water (solubility of $MgHPO_4 \cdot 7H_2O$).

$MgHPO_4$ will absorb ammonia when in contact with a strong ammoniacal medium, and since water is present the following reaction could occur:

(2) $Mg^{++} HPO_4^{--} + NH_4OH = MgNH_4PO_4 + H_2O$

But since ammonium nitrate is also present in the solution the following may result:

(3) $Mg^{++} HPO_4^{--} + NH_4^+ NO_3^- = MgNH_4PO_4 + HNO_2$

However, these reactions would not explain an evolution of ammonia as occurs in the present fertilizer because $MgNH_4PO_4$ has but a solubility of 0.0251 gram per 100 cc. of cold water. And the speed of reaction would depend upon the replacement of a solid of solubility of 0.3 gram by one of but 0.0251 gram per cc. of cold water.

But magnesium ammonium phosphate ($MgNH_4PO_4$) is soluble in acid, and furthermore upon dissolution it partially decomposes. Ammonium nitrate gives an acid reaction when dissolved in water. Also Equation 3 shows that the acidity of the solution is increased with the formation of $MgNH_4PO_4$.

Therefore, in an acid solution the ionic equation with a solubility constant $K_{sp}$ may be expressed as follows:

(3a) $(Mg)^{++} (NH_4)^+ (PO_4)^{---} = K_{sp}$ where $K_{sp}$ is the ionization constant of the solubility products and conditions would be considerably altered from those surrounding Equations 1, 2 and 3 which are given above. However, in a saturated solution of $MgNH_4PO_4$ some of the $NH_4$ ions will be transferred into $NH_4OH$. Equilibrium is dependent on the $OH^-$ and hence the $H^+$ concentration as shown by the equation (4) $NH_4^+ + OH^- \rightleftharpoons NH_4OH$ Dilution enhances Reaction 4 thus raising the pH. This is an explanation why the fertilizer becomes basic when diluted 1 oz. to 1 gal. of water through the fertilizer itself is acidic. Equation 4 also raises the pH of the fertilizer.

Reference is again made to Equation 3a. The trivalent phosphate ions from (3a) are hydrolyzed and the amount transformed into $HPO_4^{--}$ and $H_2PO_4^{-}$ depends upon the hydrogen ion concentration of the solution and the third and second "ionization constant" of phosphoric acid as in the equations which follow.

(5) $PO_4^{---} + H_2O \rightleftharpoons HPO_4^{--} + OH^-$
(6) $HPO_4^{--} + H_2O \rightleftharpoons H_2PO_4^- + OH^-$ The presence of water favors Equations 5 and 6 resulting in an increase in pH.

If a large excess of ammonium hydroxide is present, the hydrolysis reactions above are suppressed, but under the conditions of the present fertilizer a large excess of ammonium hydroxide is not present and $PO_4^{---}$ is hydrolyzed thereby giving (7) $NH_4NO_3 + H_2O \rightleftharpoons NH_4OH + HN_3$ and (8) $NH_4OH \rightleftharpoons NH_3 + H_2O$ Under normal conditions Reactions 7 and 8 would be slow. However, with $Na_2HPO_4$ ionically in solution as $(Na_2)^+ (HPO_4)^{--}$ the above Equations 7 and 8 would be upset by the following reactions:

(9) $(Na_2)^+ (HNO_4)^{--} + H_2O \rightleftharpoons NaOH + (H_2PO_4)^- + Na$ then

(10) $(Na)^+ (H_2PO_4)^{--} + NH_4^+ NO_3^-$
$\rightleftharpoons (Na)^+ (NH_4)^+ (HPO_4)^{--} + HNO_3$ Furthermore, according to Reactions 5 and 6 the ions $HPO_4^{--}$ and $H_2PO_4^-$ do exist in the solution. Then in an acid solution diluted with water there is

(11) $(Na)^+ (NH_4)^+ (HPO_4)^{--} + H_2O$
$\rightleftharpoons (Na)^+ (H_2PO_4)^- + NH_4OH$ and the pH of the fertilizer is increased; again the following would occur:

$NH_4OH \rightleftharpoons NH_3 + H_2O$

From the foregoing equations it can be seen that the presence of phosphates from the $MgNH_4PO_4$ and especially the $(HPO_4)^{--}$ and $(H_2PO_4)^-$ ions enhance the rate of formation of free ammonia at a much greater rate than that possible if only $NH_4NO_3$ were present and the mechanism were only according to Equations 7 and 8.

Therefore, the chemical explanation of the evoltuion of free ammonia from the present fertilizer composition lies in the formation of:

$(Mg)^{++} (NH_4)^+ (HPO_4)^{---}$ --- A source of $NH_4OH$
$(Na)^+ (NH_4)^+ (HPO_4)^{---}$ --- A source of $NH_4OH$
$(HPO_4)^{--}$ and $(H_2PO_4)^-$ ions _ From Equations 6 and 9 which act as a driving force to form $NaNH_4HPO_4$. In other words, the phosphate ions as shown ionized in Equation 3a catalyzes the release of $NH_3$. Thus, there is magnesium ammonium phosphate in solution as well as evolution of free ammonia from the fertilizer.

Two other equations help show the formation of some of the fertilizing effects of the solution and are given as:

(12) $2NH_4NO_3 + Na_2SO_4 = (NH_4)_2SO_4 + 2NaNO_3$ which arises from the products of Equation 1 and the excess of $NH_4NO_3$. There is also a further equation in this connection

(13) $5(NH_4)_2SO_4 + 6HNO_3 = 5H_2SO_4 + 18H_2O + 8N_2$ which could possibly occur.

The capability of a solution to act as a buffer depends on a weak base or acid and the salt of a weak acid being present at the same time.

The order of mixing the various ingredients specified above has also been found to be critical from the standpoint of producing a commercial product in a minimum of time, with a minimum of physical operations thereon, and with minimum heat loss. Under those circumstances where it would be found practical to carry out extensive grinding procedures and agitation of the solution for long periods, the materials could be mixed in a different serial order, but these steps would not be for the most part practical from a commercial standpoint. The order of combining the ingredients in an economical manner to produce a storable and readily saleable product, has been found to be serially, water, magnesium sulfate, sodium dibasic phosphate, potassium chloride, borax and ammonium nitrate. When this order is violated, large crystals are formed making the product undesirable unless it is ground or agitated for an extended period of time.

If all of the ingredients are mixed dry and then the proper amount of water added, the result is a product not readily usable without grinding or agitating for an excessive period of time. Furthermore, a dry mixture of the ingredients prohibits formation of the reaction products specified above, and the formulation does not have the properties or fertilizing characteristics of the instant liquid composition which is far superior in performance to those products now on the market.

If the potassium chloride is added prior to formation of the magnesium hydrogen phosphate in the solution, the product is not marketable without extensive grinding or agitation of the product because of the formation of large lumps and granules therein. When water is added to the anhydrous sodium dibasic phosphate before introduction of the compound into the solution, it is difficult to avoid the formation of large, hard phosphate crystals in lump or gravel size which are not readily dispersible in the solution. Furthermore, if the ammonium nitrate is added in any order other than last, the reaction products are not immediately produced and there is also a problem of formation of large lumps and crystals. The objectionable lumps or crystals would have to be filtered off, ground and returned to the liquid. This grinding could not be avoided by strong agitation for a long period of time, thus resulting in an uneconomical process.

The addition of 6.45 oz. of ammonium nitrate to 16 fl. oz. of the fertilizer composition will drop the temperature of the solution approximately 15,000 calories. This drop in temperature could cause trouble in the process but is avoided by adding the ammonium nitrate last at which time the excess thereof is dissolved by the ammonia gas. This physical reaction offsets the heat loss by a production of heat equal to the same amount of heat as would be absorbed if an equal amount of liquid ammonia were vaporized. Therefore, at the immediate end of the mixing procedure, the product is very close to room temperature.

It is important to recognize that other compounds can be substituted for those specifically named if the resulting chemical compounds operate in a manner equivalent to the ones particularly specified. As an example only, potassium nitrate can be substituted for potassium chloride with 1.37 oz. av. being utilized in place of 1.17 oz. av. of KCl. However, a chloride must still be used as a dispersing agent preceding the addition of borax and ammonium nitrate. The amount of the chloride compound used can be greatly reduced though, with 0.25 oz. av. of NaCl producing satisfactory results. Similarly, the mixing process can be somewhat altered as for example, ammonia in gaseous form can be bubbled into the solution in lieu of the addition of a portion of the ammonium nitrate as the final constituent of the product. The amount of ammonia added to the solution should be in excess of that which will react with the constituents of the fertilizer composition.

Having thus described the invention what is claimed as new and desired to be secured by Letters Patent is:

1. A method of preparing a liquid fertilizer comprising the steps of:
   (a) introducing $MgSO_4$, $Na_2HPO_4$ and $NH_4NO_3$ as reactants and a dispersing agent selected from the group consisting of NaCl and KCl, into water, sufficient quantities of respective reactants being added to said water to produce an acidic, buffered, saturated solution and suspension, the quantities of said $Na_2HPO_4$ and $NH_4NO_3$ each being provided in excess of the corresponding stoichiometric ratios thereof reactable with the constituents of the admixture and the quantity of said dispersing agent being sufficient to prevent agglomeration of particles in the admixture;
   (b) agitating the admixture; and
   (c) recovering the saturated solution and suspension after equilibrium conditions have been essentially established therein and consisting substantially of $Na_2SO_4$, $MgHPO_4$, $MgNH_4PO_4$, $Na_2HPO_4$, $NaH_2PO_4$, $NH_4NO_3$, $NaNH_4HPO_4$, $(NH_4)_2SO_4$, $NaNO_3$, $HNO_3$, $NH_4OH$, the radicals $[HPO_4]^{--}$, $[H_2PO_4]^-$, ionic Na, free $NH_3$ and $H_2O$.

2. A method as set forth in claim 1 wherein sufficient quantities of said reactants are added to the water to cause the solution and suspension to have a pH of about 5.9.

3. A method of preparing a liquid fertilizer comprising the steps of:
   (a) dissolving a quantity of $MgSO_4$ in water;
   (b) adding a quantity of $Na_2HPO_4$ to the admixture for reaction with the $MgSO_4$, the quantity of $Na_2HPO_4$ being in excess of the stoichiometric amount thereof reactable with the constituents of the admixture;
   (c) dissolving a sufficient quantity of a dispersing agent selected from the group consisting of NaCl and KCl to the admixture to prevent agglomeration of particles therein;
   (d) adding a quantity of $NH_4NO_3$ to the admixture for reaction with the constituents thereof, the quantity of said $NH_4NO_3$ added to the admixture being in excess of the stoichiometric amount thereof reactable with the constituents of the admixture, the quantities of said $MgSO_4$, $Na_2HPO_4$ and $NH_4NO_3$ added to the water being sufficient to produce an acidic, buffered, saturated solution and suspension; and
   (e) recovering the saturated solution and suspension after equilibrium conditions have been essentially established and consisting substantially of $Na_2SO_4$, $MgHPO_4$, $MgNH_4PO_4$, $Na_2HPO_4$, $NaH_2PO_4$, $NH_4NO_3$ $NaNH_4HPO_4$, $(NH_4)_2SO_4$, $NaNO_3$, $HNO_3$, $NH_4OH$, the radicals $[HPO_4]^{--}$, $[H_2PO_4]^-$, ionic Na, free $NH_3$ and $H_2O$.

4. A method as set forth in claim 3 wherein as approximate parts by weight, for each 8 parts of water, 1½ parts of $MgSO_4 \cdot 7H_2O$, 3 parts of $Na_2HPO_4$, 1⅙ parts of KCl and 6½ parts of $NH_4NO_3$ are added to said water.

5. A method as set forth in claim 3 wherein as approximate parts by weight, for each 8 parts of water, 1½ parts of $MgSO_4 \cdot 7H_2O$, 3 parts of $Na_2HPO_4$, ¼ part of NaCl and 6½ parts of $NH_4NO_3$ are added to said water.

6. A method as set forth in claim 3 wherein is included the step of bubbling free $NH_3$ into the composition until the excess $NH_4NO_3$ is dissolved.

7. A method of preparing a liquid fertilizer comprising the steps of:
   (a) introducing $MgSO_4$, $Na_2HPO_4$ and $NH_4NO_3$ as reactants into water, sufficient quantities of respective reactants being added to said water to produce an acidic, buffered, saturated solution and suspension, the quantities of said $Na_2HPO_4$ and $NH_4NO_3$ each being provided in excess of the corresponding stoichiometric ratios thereof reactable with the constituents of the admixture;

(b) agitating the admixture; and (c) recovery the saturated solution and suspension after equilibrium conditions have been essentially established therein and consisting substantially of $Na_2SO_4$, $MgHPO_4$, $MgNH_4PO_4$, $Na_2HPO_4$, $NaH_2PO_4$, $NH_4NO_3$, $NaNH_4HPO_4$, $(NH_4)_2SO_4$, $NaNO_3$, $HNO_3$, $NH_4OH$, the radicals $[HPO_4]^=$, $[H_2PO_4]^-$, ionic Na, free $NH_3$ and $H_2O$.

References Cited by the Examiner

UNITED STATES PATENTS

| | | | |
|---|---|---|---|
| 2,270,518 | 1/42 | Ellis et al. | 71—1 |
| 2,350,982 | 6/44 | Borst | 71—1 |
| 2,760,866 | 8/55 | Nielsen | 71—1 |
| 2,869,998 | 1/59 | Vierling | 71—1 |
| 2,879,151 | 3/59 | Melville | 71—1 |

FOREIGN PATENTS

| | | |
|---|---|---|
| 492,596 | 9/38 | Great Britain. |
| 741,378 | 11/55 | Great Britain. |

DONALL H. SYLVESTER, *Primary Examiner.*

ANTHONY SCIAMANNA, *Examiner.*

UNITED STATES PATENT OFFICE
CERTIFICATE OF CORRECTION

Patent No. 3,179,509 April 20, 1965

Edwin Kaine Schuman

It is hereby certified that error appears in the above numbered patent requiring correction and that the said Letters Patent should read as corrected below.

Column 5, line 45, for "+HNO$_2$" read -- +HNO$_3$ --; line 66, for "transferred" read -- transformed --; line 73, for "through" read -- though --; column 6, line 18, for "+HN$_3$" read -- +HNO$_3$ --; line 31, for "(Na$_2$+(HNO$_4$)$^{--}$" read -- (Na$_2$)+(HPO$_4$)$^{--}$ --; line 34, for "(H$_2$PO$_4$)$^{--}$" read -- (H$_2$PO$_4$)$^{-}$ --; line 57, for "(HPO$_4$)$^{---}$" read -- (PO$_4$)$^{---}$ --; same column 6, line 58, for "(HPO$_4$)$^{---}$" read -- (HPO$_4$)$^{--}$ --; column 9, line 9, for "recovery" read -- recovering --.

Signed and sealed this 23rd day of November 1965.

(SEAL)
Attest:

ERNEST W. SWIDER
Attesting Officer

EDWARD J. BRENNER
Commissioner of Patents